(12) United States Patent
Wandschneider

(10) Patent No.: US 6,220,582 B1
(45) Date of Patent: Apr. 24, 2001

(54) DEVICE FOR TRIGGERING A GAS SPRING

(75) Inventor: Guido Wandschneider, Altlussheim (DE)

(73) Assignee: Ingeborg Wandschneider, Meckesheim (DE)

( * ) Notice: Subject to any disclaimer, the term of this patent is extended or adjusted under 35 U.S.C. 154(b) by 0 days.

(21) Appl. No.: 09/214,200

(22) PCT Filed: Jun. 24, 1997

(86) PCT No.: PCT/DE97/01305

§ 371 Date: Dec. 30, 1998

§ 102(e) Date: Dec. 30, 1998

(87) PCT Pub. No.: WO98/01683

PCT Pub. Date: Jan. 15, 1998

(30) Foreign Application Priority Data

Jul. 4, 1996 (DE) .............................. 196 26 844

(51) Int. Cl.⁷ ........................................ F16F 9/02
(52) U.S. Cl. ............................ 267/64.12; 74/514
(58) Field of Search ............ 188/300; 208/64.12; 297/344.16, 344.15, 360.13, 284.2, 300.3, 301.2, 302.2; 74/110, 514

(56) References Cited

U.S. PATENT DOCUMENTS

| | | | | |
|---|---|---|---|---|
| 2,667,788 | * | 2/1954 | May et al. ............................ | 74/110 |
| 3,490,294 | * | 1/1970 | Antrim ................................... | 74/516 |
| 3,858,457 | * | 1/1975 | Mathues ................................ | 74/516 |
| 4,813,743 | * | 3/1989 | Mizelle ................................. | 297/357 |
| 4,989,698 | * | 2/1991 | Dony .............................. | 267/64.12 |
| 5,004,214 | * | 4/1991 | Marchina ........................ | 267/64.12 |
| 5,029,822 | * | 7/1991 | Selzer ............................. | 267/64.12 |
| 5,443,134 | | 8/1995 | Gajek . | |

FOREIGN PATENT DOCUMENTS

| | | | |
|---|---|---|---|
| 4114101 | * | 11/1992 | (DE) .................................. 267/64.12 |
| 4401980 | | 7/1995 | (DE) . |
| 295 16 481 U | | 4/1996 | (DE) . |
| 0549026 | | 6/1993 | (EP) . |
| 405106674 | * | 4/1993 | (JP) ..................................... 188/300 |
| 06241257 | | 8/1994 | (JP) . |
| 06272728 | | 9/1994 | (JP) . |

* cited by examiner

Primary Examiner—Matthew C. Graham
(74) Attorney, Agent, or Firm—Alston & Bird LLP

(57) ABSTRACT

A device for triggering a gas spring (b 1) with an actuating device (2) and an actuating member (4) operatively connected to the actuating device (2) and acting directly upon a terminal trigger (3) of the gas spring (1) is designed and constructed for a simple and reliable actuation with reduced triggering forces and an infinitely variable regulation of the extension speed and extended position such that the actuating member (4) is constructed as a force and/or distance reducing or multiplying lever arrangement (5), and that one of the levers—triggering lever (6)—directly presses the trigger (3)

7 Claims, 4 Drawing Sheets

DEVICE FOR TRIGGERING A GAS SPRING

BACKGROUND OF THE INVENTION

The invention relates to a device for triggering a gas spring with an actuating device and an actuating member that is operatively connected to the actuating device and directly acts upon a terminal trigger of the gas spring.

Gas springs are known from practice in a great variety of types. Numerous gas springs comprise an integrated valve system, whereby the gas spring is infinitely variable and lockable in any position. In this instance, a piston is sealed against a pressure cylinder, and it separates two gas chambers from each other. When the valve is closed, the gas spring is locked and facilitates a blocking in the desired position. By actuating a trigger, which is usually constructed as a triggering stem, the valve is opened, and the gas spring can be positioned continuously. The extension speed and cushioning can be correspondingly varied by the selection of the nozzle in the piston.

Gas springs of the type under discussion may be used in many ways. Known from practice is the use of such gas springs in desk chairs. It is likewise possible to use gas springs for adjusting automobile seats or for moving solaria. Even desks can be vertically adjusted by gas springs.

The gas springs known from practice require an actuating member which operatively connects to an actuating device and directly acts upon a trigger provided on the end side of the gas spring. For example, in the case of desk chairs actuating members are used which are constructed in the form of simple levers that normally push directly on a trigger in an end region. Such a configuration of the actuating member has the enormous disadvantage that nonetheless substantial forces are required for triggering the gas spring. Added to this is the further disadvantage that the triggering is only difficult to regulate proportionally, so that in the case of considerable triggering forces an adjustment of the gas spring speed is practically not possible.

It is therefore the object of the present invention to design and construct as well as further develop a device for triggering a gas spring in such a manner as to permit a simple and reliable actuation with reduced triggering forces and with an infinitely variable regulation of the extension speed and the extended position.

SUMMARY OF THE INVENTION

The above and other objects and advantages are achieved by the provision of a device for triggering a gas spring which is designed and constructed such that the actuating member is realized as a force and/or distance reducing or multiplying lever arrangement, and that one of the levers—triggering lever—directly pushes the trigger.

In accordance with the invention it has been recognized to depart from the triggering by means of a simple lever and design and construct instead the actuating member such that a force and/or distance reduction or multiplication is obtained. To this end, a very special lever arrangement is provided, wherein one of the levers—triggering lever—pushes the trigger. In other words, it is possible to regulate with the lever arrangement the actuation of the trigger proportionally, so as to permit a regulation of the gas spring speed on the one hand and of the extended position on the other hand with the smallest possible trigger forces of the gas spring.

In an especially advantageous manner, in particular with respect to especially favorable conditions for reducing or multiplying force and/or distance, the lever arrangement comprises an adjustment mechanism. In concrete terms, the lever arrangement may comprise an eccentric, a cam disk or cam, or a gear, or even a gearing. In any event, it is possible to design and construct the lever arrangement for a force and/or distance reduction or multiplication in any desired manner. What matters primarily is that the trigger forces are reduced.

In concrete terms, the triggering lever could be jointed at its one end for pivotal movement about a stationary axis of rotation. At its other end, it could be connected to a second—connecting lever—for rotation about the end thereof. The connecting lever again could be connected at its other end for rotation to a third lever—actuating lever. This actuating lever could again be jointed at its one end for pivotal movement about a stationary axis of rotation and be operatively connected at its other end with the actuation device. As a whole, within the scope of such a configuration three levers are provided, which favor a reduction of the trigger force at a corresponding ratio of the lever sections of the triggering lever on the one hand and the actuating lever on the other hand. More specifically, it would be possible to predetermine the extent of the force and/or distance reduction or multiplication based on the ratio of the lever sections, namely on the one hand of the triggering lever between the stationary axis of rotation and the trigger as well as between the trigger and the pivotal connection with the connecting lever, and on the other hand of the actuating lever between the stationary axis of rotation and pivotal connection with the connecting lever, as well as between the pivotal connection with the connecting lever and the free end or operative connection with the actuating device.

As regards a concrete arrangement of the actuating member, same may be aligned with the gas spring and arranged in a frame adjacent the trigger. The frame itself could comprise a total of four, in this instance preferably freely extending frame posts for receiving in pairs the stationary axes of rotation.

Furthermore it will be especially advantageous, when the frame is dimensioned such that it is inserted together with the gas spring in a preferably tubular casing. At the free end of the frame, a cover could close the casing, so that the entire casing is closed on the actuation side.

As previously mentioned, the actuating device acts upon the trigger, directly or indirectly, via the actuating member. Within the scope of a first possible configuration, the actuating device could act upon the actuating member electrically, preferably via a miniaturized servomotor or stepping motor. Within the scope of a second possible configuration, the actuating device could act upon the actuating member by induction. According to a third possible configuration, the actuating device could act upon the actuating member via a magnet, such as an electrically operating lifting or printer magnet. Likewise, it would be possible within the scope of a further possible configuration to cause the actuating device to act upon the actuating member hydraulically or pneumatically. Finally, with respect to a particularly simple configuration of the device in accordance with the invention, it will be of advantage, when the actuating device acts upon the actuating member via a cable line or Bowden cable.

Should a Bowden cable be provided, same could be jointed at its end to the actuating lever. When being pulled, the cable could pivot the actuating lever in direction of the trigger, extend through the frame, preferably inside the casing along the gas spring, emerge from the casing at the end opposite to the trigger, and finally extend via guide elements to the actuating device.

For a simple release, the actuating device comprises a lever, knob, or the like. Should a Bowden cable be used, the actuating device could comprise a lever that receives the Bowden cable at its end. In any event, it is easy to engage the actuating member via such a lever, so that complicated constructions are not needed.

There exist various possibilities of improving and further developing the teaching of the present invention. To this end, one may refer to the following description of an embodiment of the invention with reference to the drawing. In conjunction of the description of a preferred embodiment of the invention with reference to the drawing, also generally preferred configurations and further developments of the teaching are explained.

DETAILED DESCRIPTION OF THE PREFERRED EMBODIMENTS

Figure 1:
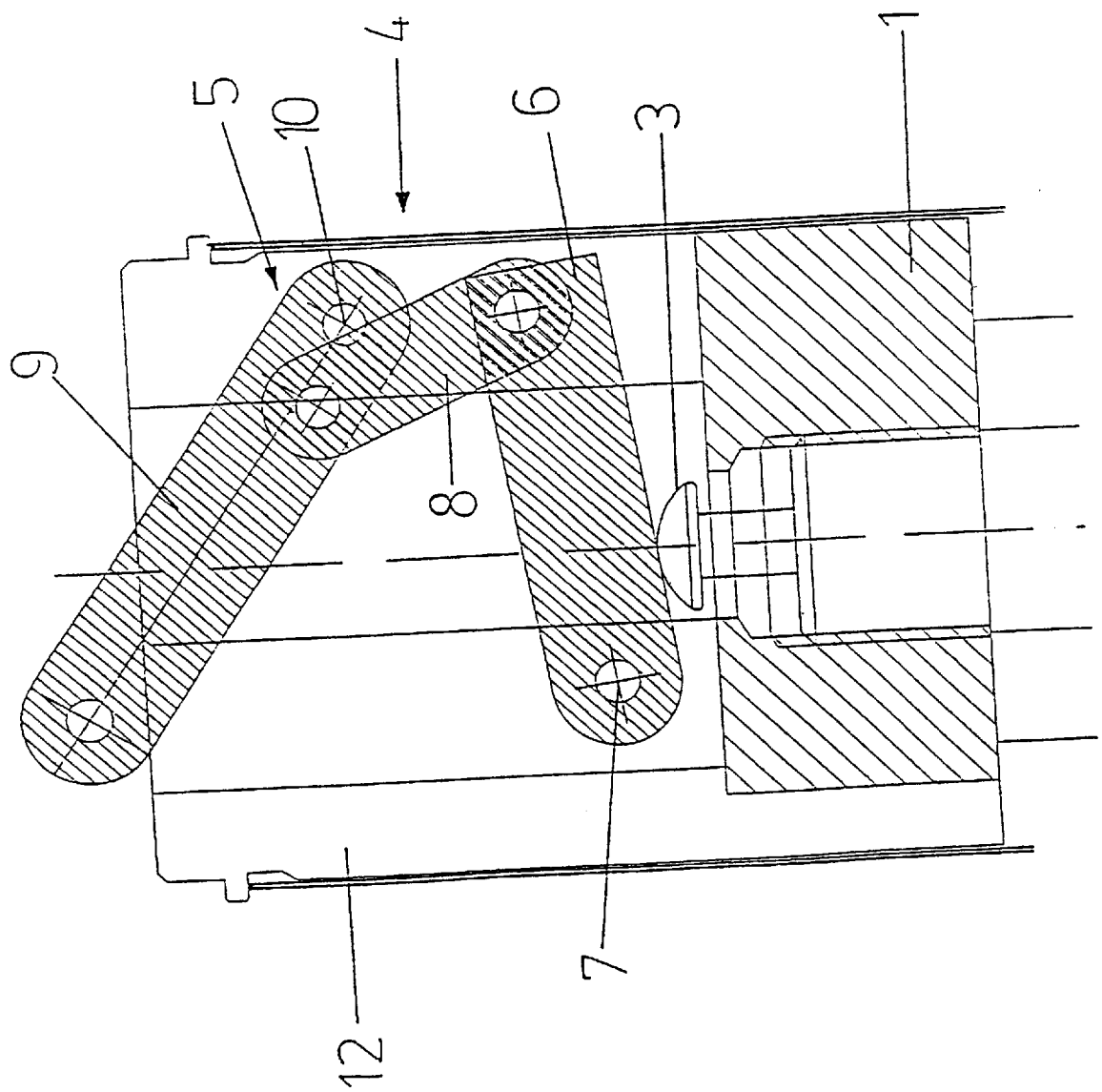
FIG. 1 is a schematic sectional side view of an embodiment of the device in accordance with the invention when the trigger of the gas spring is not operated, the Figure showing only the actuating member and the trigger.

The Figures illustrate a device for triggering a gas spring 1, of which only an end side is shown. The device comprises an actuating device schematically indicated at 2 and an actuating member 4 that is operatively connected to the actuating device 2 and acts upon a terminal trigger 3 of the gas spring 1.

In accordance with the invention, the actuating member is 4 is realized as a force and/or distance reducing or multiplying lever arrangement, wherein one of the levers, a so-called triggering lever 6 directly acts upon the trigger 3.

Figure 2:
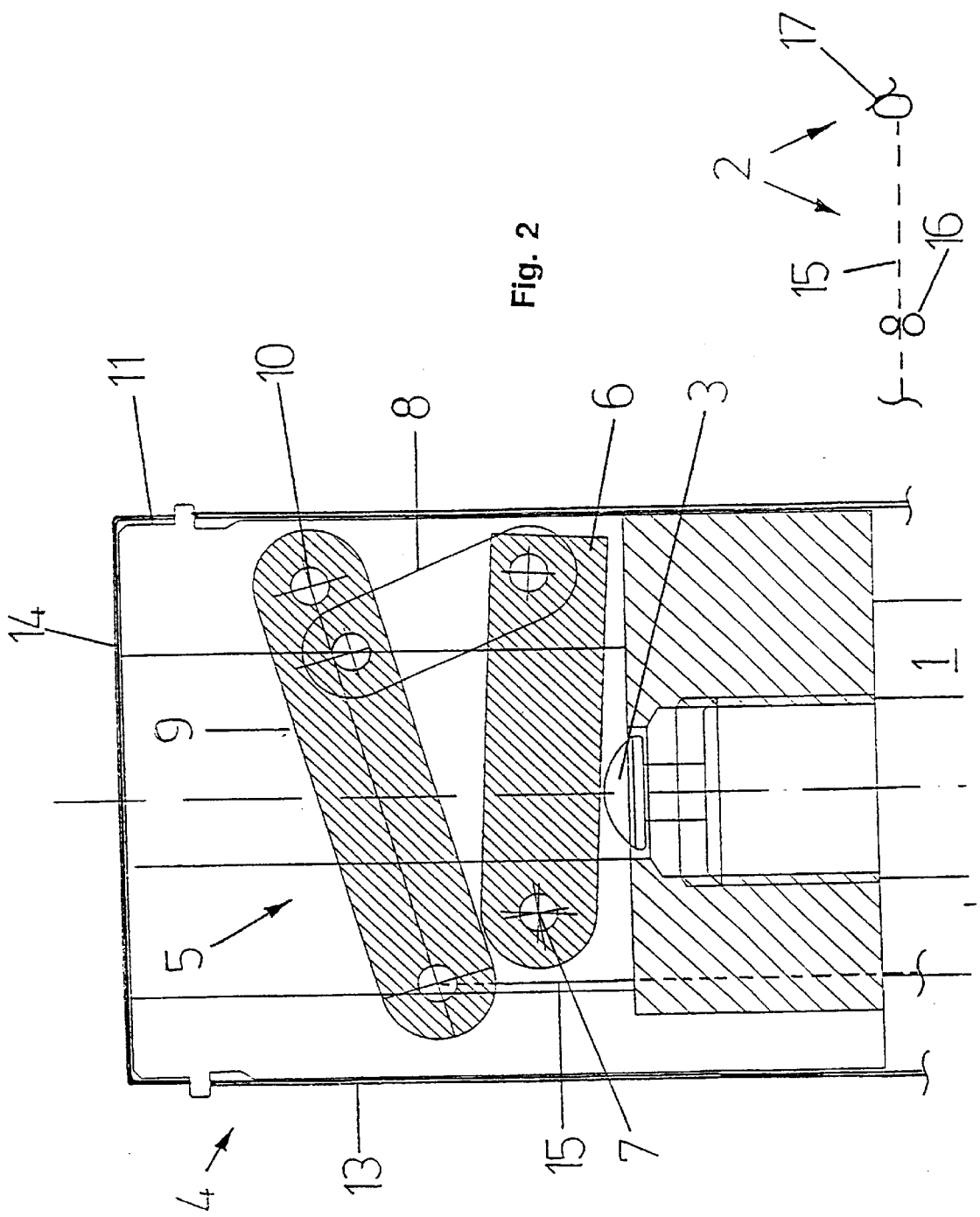
FIG. 2 is a schematic sectional side view of an embodiment of the device in accordance with the invention when the trigger of the gas spring is operated, the Figure showing only the actuating member and the trigger.
Figure 3:
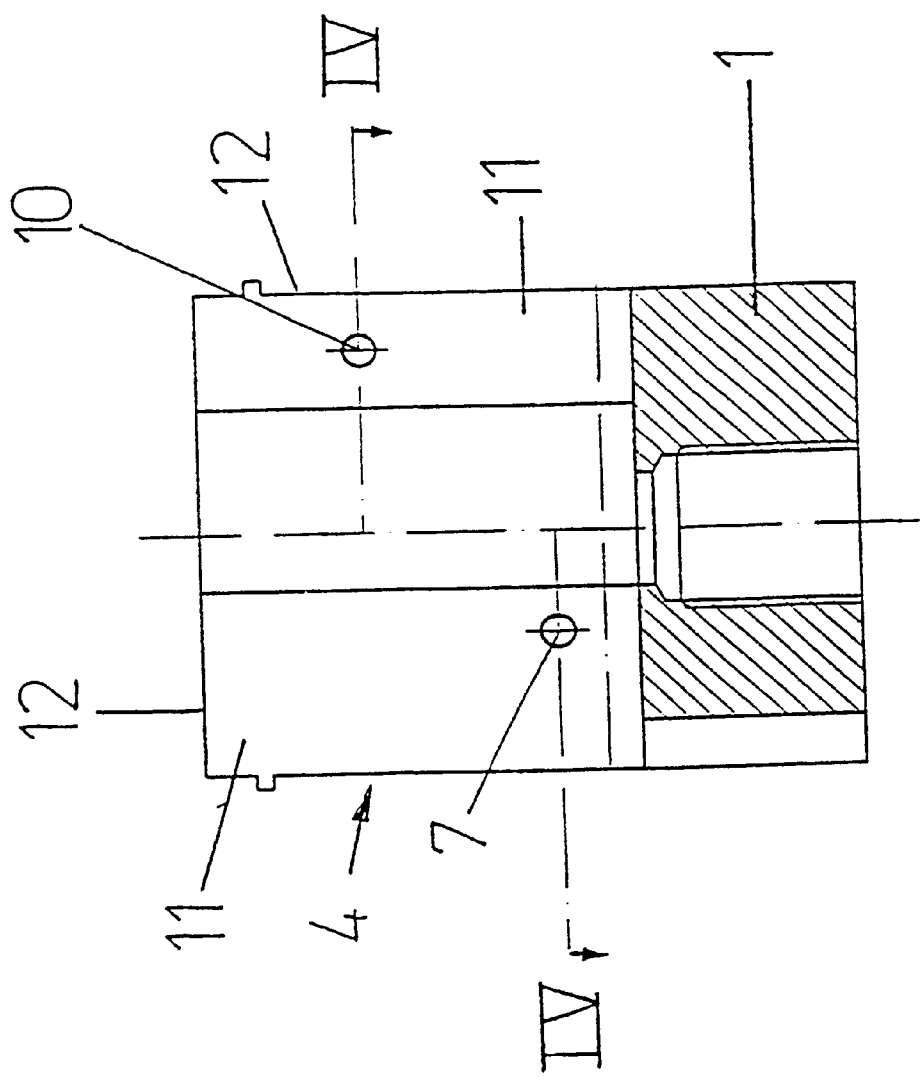
FIG. 3 is a sectional side view of the frame of the actuating member without the lever arrangement.
Figure 4:
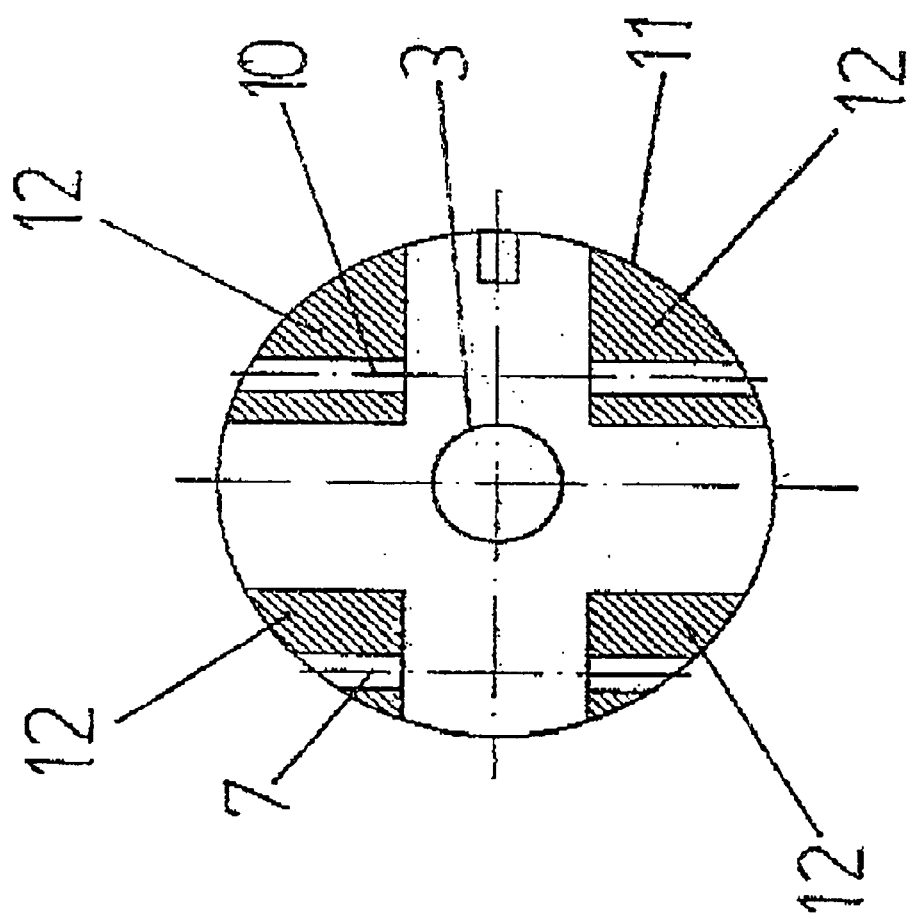
FIG. 4 is a sectional view of the embodiment of FIG. 3 along the line IV—IV.

FIGS. 1 and 2 show very clearly that the triggering lever 6 is jointed at its one end for pivotal movement about a stationary axis of rotation 7. At its other end, it is connected for rotation to the one end of a second lever, the so-called connecting lever 8. With its other end, the connecting lever 8 is connected to a third lever, the so-called actuating lever 9. At its one end, the actuating lever 9 is jointed for pivotal movement about a stationary axis of rotation 10. At its other end, it is operatively connected to the actuating device 2.

The extent of force and/or distance reduction or multiplication is predetermined by the ratio of the lever sections, namely, on the one hand, of the triggering lever 6 between the stationary axis of rotation 7 and trigger 3 as well as between the trigger 3 and the pivotal connection to the connecting lever 8, and on the other hand of the actuating lever 9 between the stationary axis of rotation 10 and the pivotal connection to connecting lever 8 as well as between the pivotal connection to connecting lever 8 and the free end or operative connection to the actuating device 2.

As can be noted from all Figures, the entire actuating member 4 is in alignment with the gas spring 1. Furthermore, the actuating member 4 is arranged in a frame 11 adjacent trigger 3. The frame 11 has a total of four posts 12 that freely extend at the end side and are used for receiving in pairs the stationary axes of rotation 7 and 10.

Together with the gas spring 1, the frame 11 is inserted into a tubular casing 13, which is closed by a cover 14 at the free end of frame 11.

As regards a particular actuation or configuration of the actuating device, the general description is herewith incorporated by reference for purposes of avoiding repetitions. In the selected embodiment, the actuating device 2 operates the actuating member 4 via a Bowden cable 15. The Bowden cable is jointed to the end of actuating lever 9 and pivots, when being pulled, the actuating lever 9 in the direction of trigger 3. The Bowden cable extends through the frame 11 inside casing 13 along the gas spring 1, and emerges from the casing 13 on the side opposite to or facing away from the trigger 3. Finally, the Bowden cable 15 extends via only indicated guide elements 16 to the actuating device 2. The latter may be provided for a triggering with a kind of actuating lever 17.

Finally, it should be explicitly pointed out that the above-described embodiment serves only to discuss the claimed teaching, without however limiting same to this embodiment.

What is claimed is:

1. A device for triggering a gas spring having a trigger which is moveable between a locked position and a release position and comprising a triggering lever having one end mounted for pivotal movement about a first fixed axis and positioned for engagement with said trigger at a medial location along the length of said triggering lever, a connecting lever pivotally connected at one end thereof to an opposite end of said triggering lever, an actuating lever having one end mounted for pivotal movement about a second fixed axis, with the actuating lever having an opposite free end, and with the connecting lever being pivotally connected to the actuating lever at a location intermediate the ends of the actuating lever, and an actuating device for moving said opposite free end of said actuating lever so as to cause said triggering lever to engage and move said trigger toward one of said locked and release positions.

2. The device as defined in claim 1 wherein the triggering device is configured as a force and/or distance reducing or multiplying lever arrangement, with the reducing or multiplying lever arrangement being defined by 1) the ratio of the distance between the first fixed axis and the trigger, and the distance between the trigger and the pivotal connection between the triggering lever and the connecting lever, and 2) the ratio of the distance between the second fixed axis and the pivotal connection between the connecting lever and the actuating lever, and the distance between the pivotal connection between the connecting lever and the actuating lever and the opposite free end of the actuating lever.

3. The device as defined in claim 2 wherein said actuating device comprises a cable having one end fixed to said opposite free end of said actuating lever, so that when an opposite end of the cable is pulled it pivots the actuating lever in the direction of the trigger.

4. The device as defined in claim 2 further comprising a frame enclosing said triggering device and at least a portion of the gas spring which includes the trigger, with said frame including bores which define said first and second fixed axes.

5. The device as defined in claim 2 wherein said first and second fixed axes are parallel to each other and disposed on opposite sides of the trigger.

6. The device as defined in claim 5 wherein the first and second axes are spaced from each other in an axial direction which is defined by the movement of the trigger.

7. The device as defined in claim 6 wherein the actuating lever generally overlies the triggering lever on the side thereof opposite the trigger.

* * * * *